United States Patent [19]

Kneer

[11] 4,392,881
[45] Jul. 12, 1983

[54] PROCESS FOR COMPOSTING DECAYING MATERIAL OF ORGANIC WASTE AND/OR SEWAGE SLUDGE IN TWO PROCESSING STEPS

[75] Inventor: Franz Kneer, Eschenburg-Eibelshausen, Fed. Rep. of Germany

[73] Assignee: Gebrüder Weiss KG, Dillenburg, Fed. Rep. of Germany

[21] Appl. No.: 279,065

[22] Filed: Jun. 30, 1981

[30] Foreign Application Priority Data

Jul. 1, 1980 [DE] Fed. Rep. of Germany ....... 3024813

[51] Int. Cl.³ ............................................. C02F 11/16
[52] U.S. Cl. ........................................ 71/9; 210/605; 210/609; 210/630; 71/10; 71/12
[58] Field of Search ............... 210/605, 609, 612, 630, 210/613; 71/9–13

[56] References Cited

U.S. PATENT DOCUMENTS

| | | | |
|---|---|---|---|
| 4,050,917 | 9/1977 | Varro | 71/9 |
| 4,062,770 | 12/1977 | Kneer | 71/9 |
| 4,184,269 | 1/1980 | Kneer | 71/9 |
| 4,249,929 | 2/1981 | Kneer | 71/9 |
| 4,288,241 | 9/1981 | Shelef | 71/12 |

FOREIGN PATENT DOCUMENTS

| | | | |
|---|---|---|---|
| 2415067 | 10/1975 | Fed. Rep. of Germany | 71/9 |
| 2423744 | 11/1975 | Fed. Rep. of Germany | 71/9 |
| 2451284 | 5/1976 | Fed. Rep. of Germany | 71/9 |

Primary Examiner—Benoit Castel
Attorney, Agent, or Firm—Toren, McGeady and Stanger

[57] ABSTRACT

A method for composting decaying material by first treating the material to produce a decayable carbon/nitrogen ratio and continuously and countercurrently aerating the decaying material in a first step to produce a biologically active material and then introducing the biologically active material to a second step wherein it is discontinuously aerated at controlled intervals. The process produces a hygienically unobjectionable humus material in a continuous and industrially efficient manner.

5 Claims, 1 Drawing Figure

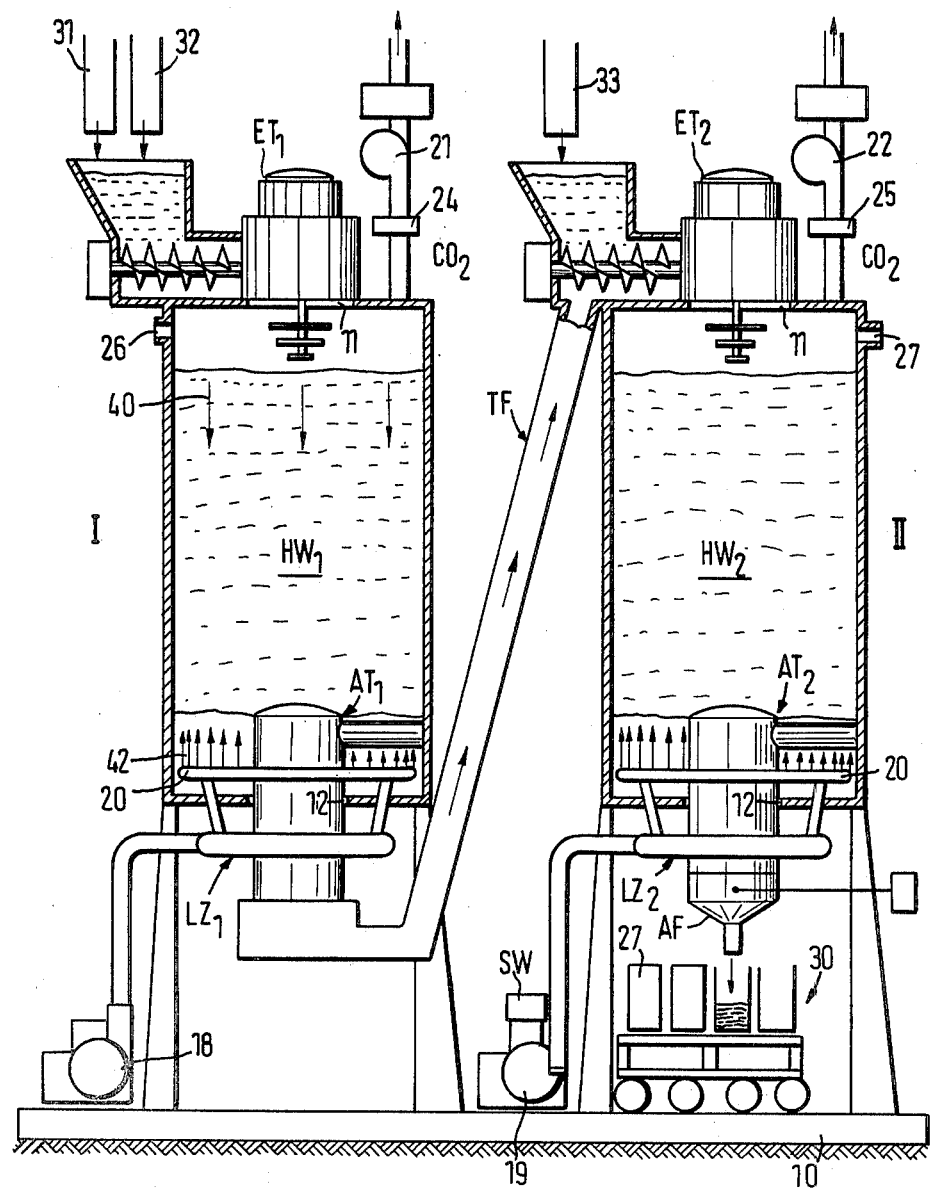

PROCESS FOR COMPOSTING DECAYING MATERIAL OF ORGANIC WASTE AND/OR SEWAGE SLUDGE IN TWO PROCESSING STEPS

BACKGROUND OF THE INVENTION

1. Field of the Invention

The invention relates to a process for composting decaying material or organic waste and/or sewage sludge.

2. Description of the Prior Art

German Auslegeschrift No. 24 32 744 discloses a treatment for sewage sludge wherein the sludge, after the addition of carbon carriers, may be mixed and aerated in a pre-composting silo. After a dwell time of 24 hours, it is conveyed to the top stage of a multi-stage composting silo in order to aerate the decaying material for a time period between 12 and 14 hours with air which has been preheated to +26° C. The decaying material, so treated, is then transferred to a second stage of the silo and aerated once again there with air preheated to +26° C. This process is repeated in a third, fourth and fifth stage of the silo. Thereafter, 80% of the decaying material, with the addition of 25 kg of calcium cyanamide per cubic meter of decaying material, is conveyed via the pre-composting silo to a post-composting silo or an aeration container for a 8 to 10 day post-aeration with fresh air. The remaining 20% of the decaying material is brought together and mixed in the pre-composting silo with freshly supplied sewage sludge and a once again predetermined amount of a carbon carrier.

The sewage sludge is to be decayed, hygienized and post-matured completely in this manner in several consecutive processing steps, so that the final product is agriculturally completely usable. Since the treatment time in the individual is 24 hours in each case, a continuous throughput should be possible.

Experience has shown that gravity feed and compressed air conveying of sewage sludge, converted into a decayable state, is not possible. It is thus necessary to assign to each stage of such a multistage process mechanical conveying means, such as, for example, screw conveyors, by means of which the decaying material is constantly turned over. The constant mechanical intervention, however, prevents the build-up of an effective biological mass within the decaying material and destroys the mycelar hyphae so that, in spite of the large expenditure for equipment, complete decaying of the material becomes impossible. Moreover, the proposed interval aeration of the silo in which the decaying takes place, in conjunction with a stirrer, is a hindrance for good initiation of the decaying. As a result of the interval aeration, suitable living conditions for multiplication are offered to only a few strains of bacteria and microorganisms, which normally take part in the decaying process. Also, because of the proposed manner of guiding the air, this can not be changed in the subsequent stages of the decaying. Finally, the different aeration of each stage of the decaying requires a high expenditure for equipment which is complicated to use.

In order to obtain a hygienically unobjectionable, biologically active, valuable humus material as end product of a decaying process which is to be carried out on a large, industrial scale, insofar as possible, optimal living conditions should be offered to all microorganisms and bacteria present in the decaying material. This allows them to multiply rapidly and through their metabolic processes, carry out the decay and conversion of the organic waste in the humus within a shorter time than is required in nature.

Such a decaying process is described, for example, in German Auslegeschrift No. 22 53 009. In this process, by carefully keeping to the parameters which influence the decaying process and which are controlled essentially by the supply of air, a differential layering of heat and oxygen and, consequently, a differential distribution of specific bacteria, is achieved within the column of material within an aeration reactor. This leads to a differentiated activity of aerobic and anaerobic bacteria, which is optimal for the decaying process.

In such a decaying process, the decaying material passes through the aeration reactor within a period of about 14 to 20 days, the dwell time being determined essentially by the desired degree of maturity of the compost obtained as the final product. If the decaying time is too short, an immature compost is obtained, which then must be matured preferably in compost heaps. Such a maturing process requires special areas and, due to atmospheric effects, is completely uncontrolled. It also happens that, in efforts to increase profits, compost which is not yet mature comes on the market since the external, visible layers of the composte piles already have the appearance and odor of fresh forest soil. Finally, valuable nitrogen is lost during the maturing processing a compost pile.

BRIEF DESCRIPTION OF THE DRAWING

The FIGURE is a schematic drawing of an apparatus for carrying out the present invention.

SUMMARY OF THE INVENTION

I have discovered a method for optimizing the composting of compost material from organic waste and/or sewage sludge (hereinafter referred to as waste), using two processing steps in order to create biological conditions, which vary with the degree of maturity of the waste and are optimum for growth of the bacteria and microorganisms which participate in the conversion of the decaying material into compost.

More particularly, I have found that this can be accomplished by first bringing the decaying material to a decayable C/N ratio and aerating it continuously and countercurrently in the first processing step and then aerating it discontinuously at controllable intervals in the second processing step, which directly follows the first step.

DESCRIPTION OF THE PREFERRED EMBODIMENT

According to a preferred embodiment of the invention, the decaying material is introduced into the upper portion of a first vessel closed against atmosphere and discharged from the bottom in such a manner, that each particle of the column of decaying material passes through the first vessel within 7 to 14 days. The column of material is aerated countercurrently and continuously from below in such a manner, that different heat layers and oxygen layers are formed within the column of material with a specific distribution of aerobic and/or anaerobic bacteria. The decaying material, which is now biologically active, is transferred to a second vessel closed against atmosphere and based on the amount of discharge, passes through the second vessel within 14 to 20 days. In the second vessel, the material is aerated discontinuously at intervals spaced in such manner, so that only aerobic processes take place in the material present.

As a result of the two-step decaying process of the present invention, the decaying material, decayed in an established processing step, is supplied to a second processing step, which is closed off from the atmosphere and in which, likewise, optimal living conditions are offered to the aerobes, which account for all the decay activity in this processing step. Each step of the process is therefore assigned to a different biology. That is, in the first step of the process, a differentiated layering of anaerobic and aerobic bacteria and microorganisms are operative, and in the second step. a complete aerobic maturing of the decayed material is employed. Furthermore, a continuous, countercurrent aeration is used in the first step and an interval aeration is used in the second step.

During the aeration in the second step, air channels may form within the column of material and the microorganisms can be hampered by the air supplied. However, the microorganisms can recover during the aeration pause and become unimpededly active. By transferring the decayed material from a first to a second step, it is easily possible to mix it with organic and/or inorganic improvement agents. Finely ground ash or sand can also be supplied before the second step in order to adjust and match the matured compost for the respective application purpose, as desired by commercial horticulture.

Also, since the post-decaying is carried out in a vessel which is closed on all sides, nitrogen is not lost from the compost leaving the first step as it matures. All portions of nitrogen are converted into nitrate nitrogen. Finally, the decay of the carbon portion in the decaying material can be controlled more accurately in the second step than in previous processes.

The inventive process therefore saves not only labor and conserves areas for piling the compost, it also produces a better product than obtained with the prior processes. The matured compost obtained at the end of the second step of the process, can be packaged directly and utilized. Finally, the inventive process enables fodder to be produced from organic waste and suitable agents can be added in a closed process, without contaminating the environment by malodorous or polluted air.

Referring now to the figure which is a schematic representation of a plant for carrying out the inventive process, a vessel I of circular cross-section and a vessel II also of circular cross-section are installed upright on foundations 10 set in the ground. The walls of these vessels are heat-insulated. Each vessel has a central inlet opening 11 at the top, which is not shown in greater detail, as well as a central outlet opening 12 at the bottom. In each case, motor-driven feeding devices ET 1 and ET 2, which are represented only schematically, are associated with the inlet openings 11, while motor-driven discharge devices AT 1 and AT 2 are assigned to each of the outlet openings 12. At the bottom of each vessel I and II, there is a facility $LZ_1$ and $LZ_2$ for supplying air, each of which is supplied with fresh air taken from the atmosphere via a motor-driven pressurized blower 18 or 19, which is not shown.

The fresh air, aspirated by the pressurized blower, is conveyed through aeration pipes 20, which are not shown in detail, into vessels I and II, in order to flow there, in a manner still to be described, through the material debris $HW_1$ and $HW_2$ in the vessels. By means of exhaust fans 21 and 22, a negative pressure is produced above each of the columns of material, formed by the debris, so that the air-gas mixture, emerging at the top of each column of materials is aspirated, purified by a filter and transferred to the atmosphere. Carbon dioxide measuring devices 24 and 25 are connected in the waste air pipelines. Depending, for example, on the $CO_2$ content of the waste air and a given nominal value, the air throughput through the material debris $HW_1$ is controlled in a manner still to be described by means of a controller, which is not shown and which controls the drive motors of the blowers 18 and 19.

The air throughput through vessel II is controlled with the help of a control mechanism SW, which per se is known and not shown in greater detail and which determines the length of operation of the pressurized blower 19 as well as that of the exhaust fan 22 in a manner still to be described.

Each of vessels I and II is equipped with a negative pressure valve 26 or 27 which connects the interior of the vessel with the atmosphere as soon as a predetermined negative pressure in the vessel is exceeded.

The outlet opening 12 of vessel I is connected by way of a conveying device TF with the feed device ET 2 for the inlet opening of vessel II. The outlet opening 12 of vessel II is provided with a filling device AF which, in a manner not shown in greater detail, works together with the transfer device for the bags 27 for receiving the matured compost. The organic waste to be decayed is supplied to the feeding device $ET_1$ over a suitable conveying device 31 and the carbon carriers, for example, sawdust, and additions for adjusting to a decayable C/N ratio, over a conveying device 32. The organic and/or inorganic additions, which improve the decaying material, can be supplied to the feeding device $ET_2$ over a conveying device 33. Before they are supplied to the feeding device $ET_2$ of vessel II in order to take part in the maturing process there, these additives are intimately mixed with the almost completely decayed material taken from vessel I.

The mode of action of the arrangement described is as follows:

The decaying material, in the form of the material column $HW_1$ and adjusted to a decayable C/N ratio, is brought into vessel I with the help of the feeding device $ET_1$ and discharged with the help of the discharging device AF. This is effected so that the decaying material is passed through vessel I in the direction of the arrows 40 from top to bottom and, at the same time, it is aerated countercurrently by the air feeding device $LZ_1$ in the direction of the arrows 42. The aeration is metered so that, within the column of material in vessel I, a different layering of heat and oxygen and therefore a differential distribution of specific bacteria and microorganisms, which participate in the decaying process, is achieved. This leads to a differentiated aerobic and anaerobic bacterial activity throughout the column of material which is optimal for the decaying process. The air throughput per hour here is about 1 to 2.5 times the capacity of the vessel. The supply of decaying material and the discharge of decayed material is adjusted so that each particle of material requires about 7 to 14 days in the debris in order to pass through vessel I. Such a process is described and illustrated, for example, in German Auslegeschrift No. 25 41 070.

The decayed material, a so-called fresh compost, is discharged over the discharging facility $AT_1$ and, in proportion to the discharge, is supplied over conveying device TF and feeding device $ET_2$ to vessel II, so that in this vessel, a column of material debris $HW_2$ is also formed. This debris consists entirely of biologically active decaying material. The discharging device $AT_2$ of vessel II is now so controlled, that each particle in the debris passes through vessel II in a time from about 14 to 20 days. The throughput of vessel II and its capacity are matched to the throughput and capacity of vessel I. During this time, this material is aerated in intervals with the help of the pressurized blower and/or exhaust fan 19 and 22. This is done in such a manner, that a volume of air, corresponding to one or two times the capacity of the vessel, is forced through the vessel at intervals of $\frac{1}{4}$ to $\frac{3}{4}$ hours with pauses between intervals of one to five minutes. The duration of the intervals as well as the pauses between intervals can be adjusted with the help of the control mechanism SW, which has been mentioned but is not described in greater detail.

The intervals are adjusted by evaluating especially the $CO_2$ measurement of the waste air from vessel II, as well as by measuring the moisture of the mature compost discharged from vessel II. The discharged mature compost can now be filled or packaged directly, that is, immediately after being discharged from vessel II, into bags 27. Moreover, when the decaying material has become undesirably dry, it is, of course, possible to supply moisture, especially in vessel I. This addition of moisture is also described in aforementioned German Auslegeschrift No. 25 41 070. As a rule, however, the moisture should be carried away and this is accomplished by the aeration selected in vessel II.

By dividing the decay of organic waste, as described, into a controlled decaying process and into a controlled maturing process, optimal decaying conditions, which lead to significant improvement in the end product, can be achieved on an industrial scale in minimal space. It is also possible to adjust the dwell time of the decaying material in the individual vessels, so that only partial decaying takes place in vessel I and complete decaying and maturing in vessel II. The described control of air is retained here, so that there are anaerobic as well as aerobic decaying processes in vessel I and only aerobic decaying processes in vessel II. Moreover, the possibility exists for supplying suitable additives between the two steps of the process, so that improvement in the mature compost can be achieved. Also, after introducing suitable additions and fermenting them with the compost, the production of fodder from compost becomes readily possible in a continuous process starting from organic waste.

I claim:

1. A process for compositing decaying material selected from the group consisting of organic waste or sewage sludge in two processing steps comprising:
   (a) treating the decaying material to achieve a decayable C/N ratio and then continuously and countercurrently aerating the decaying material in the first processing step so as to decay the material both anaerobically and aerobically, wherein the decaying material is brought into a first vessel from above and discharged from the bottom in such a manner, that each particle of the column of material consisting of decaying material passes through the first vessel within 7 to 14 days and the column of material is aerated countercurrently and continuously from below in such a manner that different heat layers and oxygen layers are formed within the column of material and thereby support a specific distribution of aerobic or anaerobic bacteria throughout said column which effect decaying and render it biologically active; and
   (b) directly introducing this continuously aerated material to the second processing step by transferring the biologically active material from the first vessel to a second vessel which is closed to the atmosphere at a rate such that it passes through the second vessel within 14 to 20 days and is aerated discontinuously during this time at intervals in such a manner that only aerobic processes take place in the column of material present to mature the decaying material in said second vessel.

2. The process of claim 1 wherein the aeration in both processing steps is controlled in response to the $CO_2$ content of the air coming from the decaying material and the moisture content of the discharged decaying material.

3. The process of claim 1 wherein the decaying material, before being transferred to the second processing step, is mixed with organic or inorganic additions, which improve the decaying material.

4. The process of claim 1 wherein the air is supplied to the first and the second processing steps by producing a pressure or a vacuum.

5. The process of claim 1 wherein the air throughput in the first vessel is from about 1 to 2.5 times the capacity of the first vessel, the air throughput in the second vessel is about 1 to 2 times the capacity of the second vessel and the air is forced through the second vessel for periods varying from about $\frac{1}{4}$ to $\frac{3}{4}$ hours with pauses between said periods from about one to five minutes.

* * * * *